June 12, 1951   C. W. HELLBERG   2,556,539
FILTERING DEVICE
Filed July 22, 1946
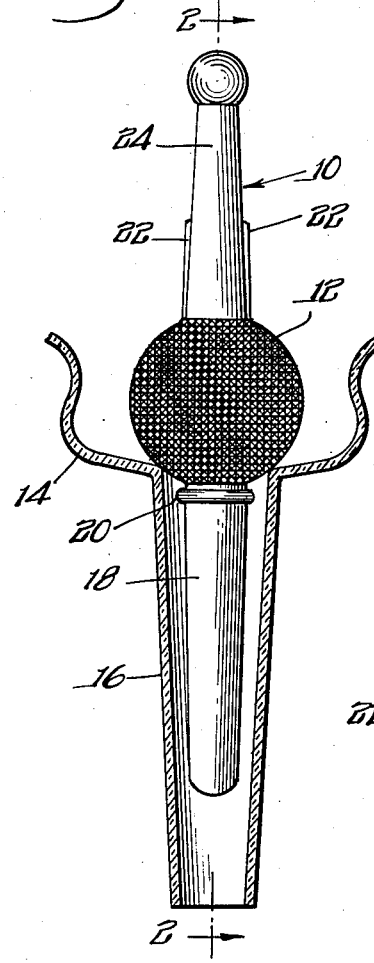
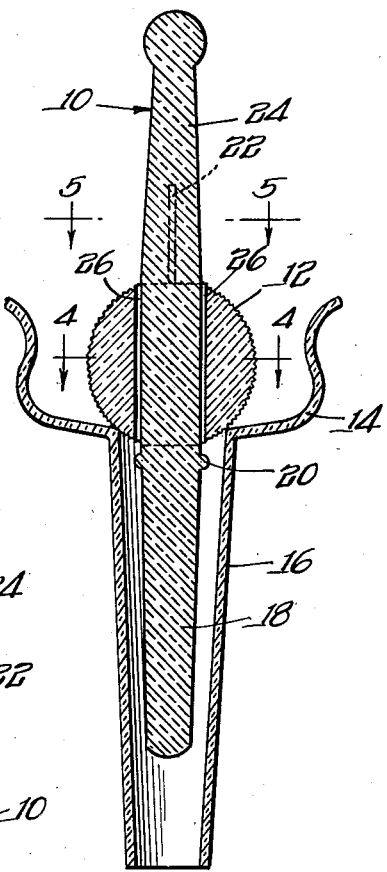
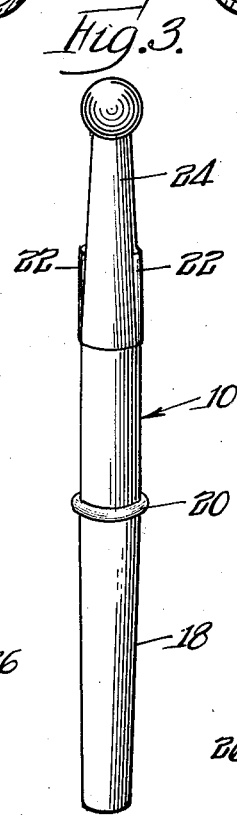
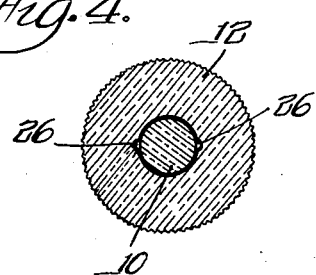
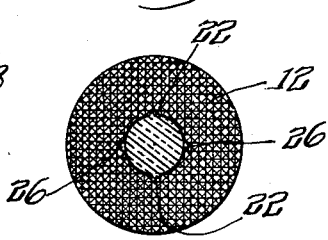
INVENTOR.
Carl W. Hellberg
BY Moore, Olson & Trexler
attys.

Patented June 12, 1951

2,556,539

UNITED STATES PATENT OFFICE 2,556,539

FILTERING DEVICE

Carl W. Hellberg, Chicago, Ill.

Application July 22, 1946, Serial No. 685,540

2 Claims. (Cl. 210—162)

This invention relates to coffee makers of the so-called vacuum type, and particularly to the filtering devices used in such coffee makers.

In vacuum type coffee makers, the dry coffee, tea, or other ingredient is placed in an upper bowl which communicates with a lower bowl in which the water is placed. Heat is applied to the lower bowl and the generated steam pressure forces the heated liquid up through a suitable passageway and into the upper bowl to form the coffee or other infusion as the case may be. Heat is withdrawn from the lower bowl, causing a condensation of the steam or vapor therein so that a partial vacuum is created. A filtering device intermediate the upper and lower bowls permits a retarded flow of liquid from the upper bowl to the lower bowl. The function of the filtering device is to enable a clear liquid infusion to pass into the lower bowl while preventing the passage of coffee grounds or tea leaves. The strained liquid infusion thus is drawn downwardly by reason of the partial vacuum in the lower bowl, leaving the residue in the upper bowl.

Various difficulties have been encountered heretofore in designing satisfactory filtering devices for use in coffee makers, and accordingly it is a primary object of this invention to provide an improved filtering device having a number of advantages over prior developments.

The present invention pertains specifically to that type of filtering device made of impervious material and which has a portion with a roughened exterior that is adapted to seat in the upper bowl over the tube or other passageway leading to the lower bowl of the coffee maker. The roughened portion of the filtering device, in conjunction with the inner surface of the upper bowl which it engages, acts as a strainer thereby preventing the solid contents from passing through with the liquid. The filtering device also includes an elongated stem portion depending from the strainer portion thereof into the tubular passageway of the coffee maker.

An object of the invention is to provide a filtering device of the type just described having incorporated therein certain improvements which enable the device to be manufactured at low cost and yet afford various advantageous features.

It is a further object to provide a filtering device of a novel construction whereby the strainer element and the stem portion are separable, thus affording individually replaceable parts and enabling the strainer element to be individually sized and shaped for greatest efficiency while the remainder of the device, which does not require as great precision in its manufacture, can be turned out separately.

A still further object is to provide an improved filtering device in which the strainer element can be reversed in its position relative to the stem and the filtering device as a whole can be reversed in position, yet continue to function satisfactorily.

Still another object of the invention is to provide an improved filtering device that may be used in most vacuum coffee makers now on the market employing a gravity type filter and which will seat itself properly for filtering whether the coffee maker is tilted or the filtering device is inserted in a tilted position with respect to the coffee maker.

A still further object is to increase the safety factor of a gravity type filtering device by affording means of insuring that abnormal pressures built up in the lower bowl of the coffee maker are relieved.

It is a general object of the invention to provide an improved filtering device of simple design and construction which lends itself readily to inexpensive manufacture by simple and well known methods.

Various other objects, advantages and features of the invention will be apparent from the following specification when taken in connection with the accompanying drawing wherein a preferred embodiment is set forth for purposes of illustration.

In the drawing, wherein like reference numerals refer to like parts throughout:

Fig. 1 is an elevation of a filtering device shown in the position it normally occupies when in use, this device being constructed in accordance with and embodying the principles of the invention;

Fig. 2 is a vertical sectional view taken on the line 2—2 in Fig. 1;

Fig. 3 is a detail view of the separable stem member of the filtering device, and Figs. 4 and 5 are cross-sectional views taken on the lines 4—4 and 5—5, respectively, in Fig. 2.

Referring now to the drawing, and particularly to Figs. 1 and 2 thereof, there is shown a filtering device together with adjacent portions of the upper bowl or container of the coffee maker, the parts being shown in the positions normally occupied when in use. In the illustrated embodiment the filtering device is composed of two parts, an elongated member 10, also shown separately in Fig. 3, and a substantially spherical strainer element 12. These parts may be made of any suitable heat-resisting material such as glass, metal, plastic or vitreous material. The element 12 has a roughened exterior such as may be formed by stippling or serrating the surface thereof. A preferred manner of affording the roughened surface is to run criss-cross grooves or channels across the face of the element 12, thereby forming pyramidal projections or facets. The element 12 is adapted to seat in the lower part of the upper bowl 14 of the coffee maker, covering the tubular passageway 16 which leads down into the lower bowl or container of the coffee maker. Because of its roughened surface the strainer element 12 does not afford a tight seal where it engages the neck of the upper bowl 14.

The member 10 passes vertically through a suitable opening in the element 12, the lower portion or stem 18 of this member extending into the tube 16. The stem 18 serves as a guide in properly seating the filtering device and limits any tipping movement of the device relative to the bowl 14. The member 10 has an annular shoulder 20 which normally is disposed a slight distance below the element 12 and limits movement of the element 12 toward the stem 18. The upper portion or stem 24 of the member 10 facilitates insertion or removal of the filtering device. Longitudinal splines or keys 22 are formed on the stem 24 in spaced relation to the shoulder 20, and suitable keyways 26, Figs. 2 and 4, are provided in the element 12 communicating with the central opening therein so that the element 12 can slide over the stem 24 when the keys 22 and keyways 26 are aligned. After the parts of the filtering device are assembled, the element 12 is turned so that the keys 22 and keyways 26 are out of alignment, as indicated in Figs. 2 and 5. If desired, the angular separation between the keys 22 may be made less than 180 degrees so that the element 12 can slide over the stem 24 only when the parts are in a particular angular relation to each other.

The element 12 is formed separately from the stem member 10 of the filtering device in the manufacture thereof. It is not essential that these two parts be made of the same material, although generally it may be found convenient to do so. The element 12 is accurately sized and shaped to seat in the upper bowl 14 in such a manner as to achieve the desired result of straining the liquid infusion as it is drawn from the upper bowl into the lower bowl of the coffee maker. The openings 26 in the element 12 are made sufficiently small to prevent the coffee grounds or the like from seeping into the lower container. There is little tendency for the grounds to collect near the top of the element 12, practically all of the residue accumulating in the neck of the bowl 14 surrounding the line of contact between the element 12 and bowl 14. The element 12 is made sufficiently heavy so that it properly seats when liquid is being withdrawn from the upper bowl and yet may be unseated by the liquid when it rises through the tube 16 to enter the upper bowl 14. Thus, it has a valve action which enables it to accommodate a rapid flow of liquid into the upper bowl and a gradual withdrawal of the liquid therefrom. The stem 10, being lighter in weight than the filtering device as a whole, readily rises when the vapor pressure in the lower bowl exceeds a predetermined value. This feature is of value in the event the element 12 becomes clogged with coffee grounds or other residue and is unable to move from its seat in the upper bowl 14. Under such circumstances the stem 10 will have a piston-like action whereby the shoulder 20 strikes the element 12 to jar it loose. In this way the building up of an excessive steam pressure in the lower bowl is averted.

There has been shown and described a preferred form of filtering device for efficiently straining solids from liquid infusions in vacuum type coffee makers. It should be noted that the two-piece construction of the filtering device enables replacement of the member 10 or element 12 individually in the event either of these parts is damaged. This feature also enables the element 12 to be formed separately from the member 10, which latter member does not require such high accuracy in its manufacture. The device affords a ready escape for steam and expanded air under excessive pressure so that the danger of explosion due to the clogging of the valve or strainer member 12 is eliminated. The element 12 may be turned upside down in position if desired, thus affording two distinct filter faces thereon. In addition, the assembled unit may be placed in an upright or inverted position for filtering with equal efficiency. The spherical configuration of the element 12 enables the filter device to operate satisfactorily whether in a strictly upright position or slightly tilted, as may occur when it is carelessly inserted. It will also operate satisfactorily even though the upper bowl may be tilted away from the vertical. The filter element 12 can be cleaned readily and is easily removed from the stem 10 for this purpose.

It is obvious that various changes may be made in the specific embodiment set forth for purposes of illustration without departing from the spirit of the invention. The invention is accordingly not to be limited to the specific embodiment shown and described, but only as indicated in the following claims.

The invention is hereby claimed as follows:

1. A filtering device for a vacuum type infusion apparatus comprising a substantially spherical strainer element of unitary and integral construction having an outer roughened surface and a central axial opening therethrough, said axial opening being provided with at least one minute keyway, an elongated stem member symmetrically shaped with respect to said axial opening and tightly fitting therein and in surface contact with the entire extent of the wall of the strainer element defining the axial opening exclusive of said keyway to provide a substantially impervious fit operating to substantially completely prevent the passage of fluid therebetween, said stem member providing stem portions extending from opposite sides of the strainer element and one of said stem portions having an outwardly projecting key member registering with said keyway and passing therethrough during assembly and disassembly of the strainer element and the stem member, and an outward projection on the other stem portion spaced from said key member a distance slightly greater than the axial extent of said strainer element through the axial opening to permit limited relative sliding movement between the strainer element as an integral unit and the stem member to enable fluid to pass exteriorly around the strainer element while the fluid impervious fit between the strainer element and the stem member is maintained.

2. In a vacuum type infusion apparatus having interfitting upper and lower containers and a tubular passageway extending from the upper container into the lower container and providing a valve seat at the entrance end thereof, the provision of a unitary filtering valve device in the form of a substantially spherical strainer element of unitary and integral construction having an outer roughened surface and a central axial opening therethrough, said axial opening being provided with a pair of minute keyways, an elongated stem member symmetrically shaped with respect to said axial opening and tightly fitting therein and in surface contact with the entire extent of the wall of the strainer element defining the axial opening between said keyways to provide a substantially impervious fit operating to substantially completely prevent the passage of fluid therebetween, said stem member providing stem portions extending from opposite sides of the strainer element and one of said stem portions having outwardly projecting key members spaced symmetrically with respect to the keyways in said axial opening registering therewith and passing therethrough during assembly and disassembly of the strainer element and the stem member, and an outward projection on the other stem portion spaced from said key members a distance slightly greater than the axial extent of said strainer element through the axial opening to permit limited relative sliding movement between the strainer element as an integral unit and the stem member to enable fluid to pass exteriorly around the strainer element while the fluid impervious fit between the strainer element and the stem member is maintained, the impervious fit between the strainer element and the stem member substantially preventing release of excess pressure developed in the lower container and thereby operating to effect separate upward movement of the stem member relative to the strainer element upon increase of vapor pressure in the lower container beyond a predetermined value to bring the said lower projection on the stem member into striking contact with the adjacent surface of the strainer element and to momentarily shift the strainer element from its associated valve seat on the upper container to relieve the excess pressure in the lower container.

CARL W. HELLBERG.

REFERENCES CITED

The following references are of record in the file of this patent:

UNITED STATES PATENTS

| Number | Name | Date |
| --- | --- | --- |
| 1,927,287 | Kell et al. | Sept. 19, 1933 |
| 2,058,136 | Cory | Oct. 20, 1936 |
| 2,291,427 | Wolcott | July 28, 1942 |
| 2,366,951 | Aycock | Jan. 9, 1945 |
| 2,376,410 | Wolper | May 22, 1945 |
| 2,387,322 | Francis | Oct. 23, 1945 |
| 2,390,269 | Peterson | Dec. 4, 1945 |
| 2,392,656 | Foster | Jan. 8, 1946 |